United States Patent
Kloth et al.

(10) Patent No.: US 7,286,471 B2
(45) Date of Patent: Oct. 23, 2007

(54) DYNAMIC BANDWIDTH ALLOCATION FOR WIDE AREA NETWORKS

(75) Inventors: Axel K. Kloth, Moutain View, CA (US); Warner Andrews, Boulder, CO (US); Paul Bergantino, Lexington, MA (US); Jeremy Bicknell, Carlsbad, CA (US); Daniel Fu, Sunnyvale, CA (US); Moshe De-Leon, Kiron (IL); Stephen M. Mills, Sharon, MA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1054 days.

(21) Appl. No.: 10/106,670

(22) Filed: Mar. 23, 2002

(65) Prior Publication Data

US 2003/0179767 A1 Sep. 25, 2003

(51) Int. Cl.
*H04L 12/66* (2006.01)
*G06F 15/173* (2006.01)

(52) U.S. Cl. .............. 370/230; 370/235; 370/404; 709/223

(58) Field of Classification Search .............. None
See application file for complete search history.

(56) References Cited

U.S. PATENT DOCUMENTS

| 6,522,671 | B1 * | 2/2003 | Solheim et al. ............. 370/535 |
| 6,631,134 | B1 * | 10/2003 | Zadikian et al. ....... 370/395.21 |
| 6,671,254 | B1 * | 12/2003 | Nakahira ................... 370/229 |
| 6,678,252 | B1 * | 1/2004 | Cansever ................... 370/253 |
| 2002/0059408 | A1 * | 5/2002 | Pattabhiraman et al. .... 709/223 |

* cited by examiner

*Primary Examiner*—Chi Pham
*Assistant Examiner*—Soon D. Hyun

(57) ABSTRACT

System and method for dynamically altering bandwidth allocation to each region serviced by a network. Each region is allocated an initial estimated bandwidth on the network and compares instantaneous demand against the allocation. When demand falls below the allocation, the region releases bandwidth so other regions can take advantage of that bandwidth. When demand exceeds the allocation, the region takes advantage of bandwidth released by other regions.

14 Claims, 5 Drawing Sheets

DYNAMIC BANDWIDTH ALLOCATION FOR WIDE AREA NETWORKS

BACKGROUND

1. Technical Field

This invention pertains generally to the field of computer network management, more particularly to increasing bandwidth utilization in wide area networks. This invention further pertains to a method of dynamically varying the bandwidth allocation for data coming from regions into a wide area network and an apparatus that implements the method.

2. Description of the Prior Art

The concept of wide area networks has evolved steadily in the field of computer networking. The need for global networking has resulted in the use of high-speed backbones that connect large metropolitan areas. Most installations utilize high-speed connections that connect a plurality of add-drop multiplexers to form the wide area network. The add-drop multiplexers are usually organized in the form of a ring. In a typical installation, an add-drop multiplexer services a region within the metropolitan area. The add-drop multiplexer is connected to a router. The router fans out network connections to users within the region.

Data from one region that must be delivered to another region is collected by a router and then delivered to the add-drop multiplexer affiliated with the first region. This first add-drop multiplexer injects the data into the ring. The data propagates through the ring to a second add-drop multiplexer where this second add-drop multiplexer services a different region. The second add-drop multiplexer extracts the data from the ring and forwards the data to a router that fans network connections within the second region.

The data ring formed by the add-drop multiplexers typically propagates data at extremely high-speed and at a constant data rate. Given the nature of the data ring, the amount of data that can be transmitted around the ring is usually a constant bandwidth. In order for a add-drop multiplexer to inject data into the ring, it must have a predefined allocation of bandwidth. If the cumulative bandwidth egressing from a region exceeds the bandwidth allocated to that region's add-drop multiplexer, the data may be dropped or delayed pending on the management strategy imposed on the data ring.

Up until now, the amount of bandwidth allocated to each add-drop multiplexer, i.e. to each region, is determined by monitoring data traffic patterns over some period of time. Monitoring data traffic patterns is accomplished at a network management center. Human intervention is required in the management process to determine what level of bandwidth must be allocated to each region. The bandwidth allocations may vary with each hour of each day so that a fair and reasonable bandwidth leveling can be achieved.

Once bandwidth allocations for each region are established, these bandwidth allocations must be conveyed to each add-drop multiplexer in a metropolitan area. This is typically accomplished by a direct connection from the network management center to each add-drop multiplexer. The add-drop multiplexers that year to their respective bandwidth allocations until a new allocation level is received from the network management center.

One significant problem in the known bandwidth allocation scheme is that bandwidth allocations are infrequently updated. Exasperating this problem is the fact that bandwidth allocations are established based on past network traffic. In the known art, there is simply no capability to modify bandwidth allocations on the real-time basis. This means that a region may need more bandwidth minutes present allocation where the same time a different region may not require all of the bandwidth of its current allocation. Hence, the data ring can be under utilized from the perspective of one region while at the same time appear to be bogged down from the perspective of the different region. On balance, this problem manifests itself in the form of ineffective bandwidth utilization at each add-drop multiplexer.

SUMMARY OF THE INVENTION

The present invention comprises a method and a system that embodies that method for dynamically allocating bandwidth or dynamically modulating the bandwidth available to a service region serviced by a computer network. The method begins by receiving a pre-established bandwidth allocation for each region serviced by the computer network. From the perspective of a particular region, the amount of actual outbound traffic that must be transmitted from the region onto the network must be measured. By measuring the instantaneous volume of outbound data, a decision can be made as to whether or not additional bandwidth is required above and beyond the pre-established bandwidth allocation.

If the amount of outbound data from the region exceeds the pre-established bandwidth allocation, additional bandwidth can be requested. If, on the other hand, the actual data flowing out of the region is less than the pre-established bandwidth allocation, the process provides for releasing bandwidth assigned to that region so that other regions can exploit the unused bandwidth.

In the context of one illustrative application of this process, data bandwidth in the network is partitioned into data packets. The aggregate number of data packets is allocated amongst the regions serviced by the computer network. When a particular region is not utilizing all of the bandwidth allocated to it, the process provides that the data packets owned by that region should be marked as "unneeded". When other regions need additional bandwidth, these unneeded data packets can be captured and use to transport data originating in the other regions across the network.

In one example embodiment of this process, an add-drop multiplexer is assigned to each region. The add-drop multiplexer determines if additional unutilized bandwidth is available in the network. The add-drop multiplexer can then indicate if the region can expect to acquire more bandwidth than originally allocated to it. The add-drop multiplexer in this example embodiment receive is the initial bandwidth allocation from a network management center and forwards this initial allocation value to a primary regional router that services the region. The process further provides that the primary regional router monitor the outbound traffic received at each port comprising the primary router.

Further refining this example embodiment, the add-drop multiplexer interacts with the primary router that services the region. This interaction comprises the step of sending messages to the add-drop multiplexer requesting additional bandwidth if the primary regional router determines that additional bandwidth is required to support the outbound data volume. If the add-drop multiplexer can secure additional bandwidth, a signal is sent to the primary router to proceed with the data transfer. When additional bandwidth cannot be secured, the primary regional router can be instructed to either discard the outbound data, shape the traffic profile of the outbound data for it can be instructed to throttle back the data sources feeding the outbound data.

When the add-drop multiplexer can actually secure additional bandwidth, it will receive data packets traversing the network that are owned by other add-drop multiplexers and are marked as unneeded. These data packets are then used to transport data in excess of the bandwidth allocation for the region. The add-drop multiplexer is likewise responsible for relinquishing control over data packets that are not required to support the actual amount of outbound data from the region. The add-drop multiplexer marks these data packets as unneeded so that other add-drop multiplexers in the network can take advantage of the bandwidth those data packets represent.

This process for dynamically allocating bandwidth for network can be embodied in one illustrative system comprising a bandwidth manager that is capable of receiving an initial bandwidth allocation for the region together with a traffic monitor. The traffic monitor measures the amount of data that is being sent outbound from a region. Having received from the bandwidth manager the initial bandwidth allocation for the region, the traffic monitor determines if additional bandwidth above and beyond the initial allocation is required to support the amount of traffic that must be transmitted from the region to other users.

In this example embodiment, the bandwidth manager is disposed in an add-drop multiplexer that services the region while the traffic manager is integral to a primary router that fans network connections to all users within the region. Also integral to the add-drop multiplexer is a takeoff unit. The takeoff unit receives direction from the bandwidth manager and is able to mark as unneeded data packets owned by the add-drop multiplexer and is also capable of utilizing the unneeded data packets owned by other add-drop multiplexers.

The traffic monitor sends bandwidth release or request messages to the bandwidth manager based on a comparison of the initial bandwidth allocation to the actual amount of data that must be transmitted from the region. In response to these bandwidth request messages, the bandwidth manager attempts to secure additional bandwidth on the network. If additional bandwidth cannot be secured, the bandwidth manager notifies the traffic monitor. The traffic monitor has the option of either discarding the outbound data that cannot be accommodated by the initial allocation of bandwidth, reshaping the traffic profile of the outbound data, or throttling back the sources of the outbound data.

When the bandwidth manager receives bandwidth release messages from the traffic monitor, it directs the takeoff unit to mark as unneeded data packets representing the current underutilization of bandwidth.

BRIEF DESCRIPTION OF THE DRAWINGS

The foregoing features, aspects, and advantages of the present invention will become better understood from the following detailed description of one embodiment of the invention with reference to the drawings, in which.

DETAILED DESCRIPTION OF THE INVENTION

The present invention pertains to real-time modulation of the bandwidth each add-drop multiplexer is allocated in a wide area network. Even though the present invention suitable for use in wide area networks, the fundamental process of dynamic bandwidth allocation can readily be adapted to any network structure and is not necessarily limited to application in wide area networks. It should be understood that the scope of the present invention is not intended to be limited to such wide area network application and that presentation of the invention in such application is intended as an illustrative application only.

Figure 1:
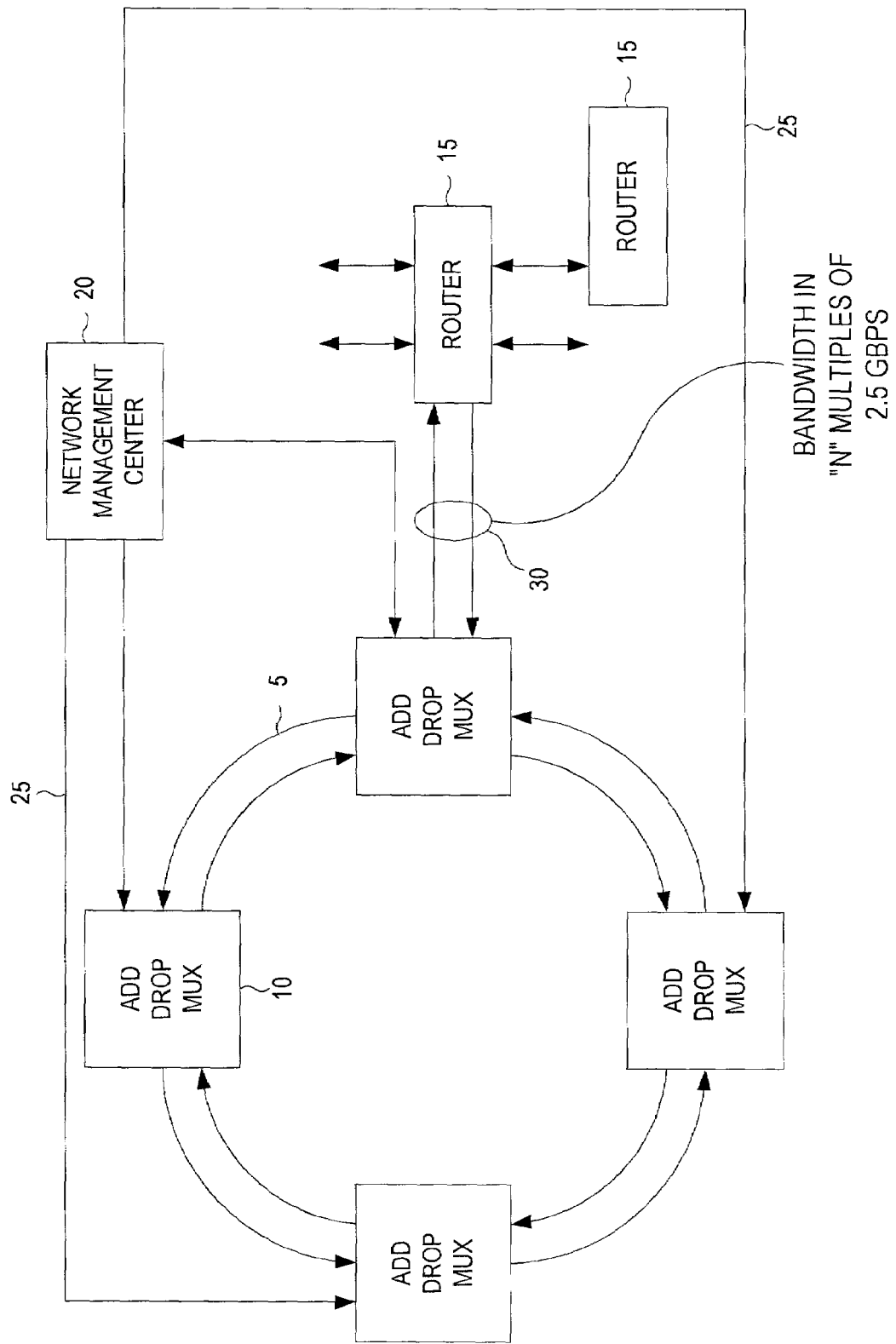
FIG. 1 is a block diagram that depicts a typical wide area network of prior art comprising add-drop multiplexers, routers and a network management center.

FIG. 1 is a block diagram that depicts a typical wide area network of prior art comprising add-drop multiplexers, routers and a network management center. It is important to appreciate the fundamental workings of a wide area network prior to discussing the advantages of the present invention. A plurality of add-drop multiplexers 10 are interconnected with high-speed interfaces to form a data ring 5. The data ring 5 typically comprises counter rotating high-speed interfaces that can be managed by the add-drop multiplexers 10 and the network management center 20 so that failures of the high-speed interfaces between any two add-drop multiplexers can be tolerated. This is typically done by causing the add-drop multiplexers at either end of the interface failure to loop back the data through the non-failed segment of the data ring.

Each add-drop multiplexer typically services a region within a metropolitan area. Within each region, a primary router 15 is connected to the add-drop multiplexer 10. Each primary router 15 may have a plurality of ports that service individual data users or can be connected to other routers in a cascaded manner. Typically, the interface between the primary router 15 and the add-drop multiplexer 10 comprises a high-speed outbound and a high-speed inbound interface relative to the region. These are normally referred to collectively as a data trunk 30. The data generated internal to a region that must be transported to another region finds its way through a series of cascaded routers 15 through to the data trunk 30 and into the add-drop multiplexer 10.

The add-drop multiplexer 10 monitors the data traffic on the data trunk 30. It should be noted that if the outbound bandwidth carried by the data trunk 30 at any time exceeds the bandwidth allocation assigned to the add-drop multiplexer 10, the data could be either dropped or delayed by the add-drop multiplexer 10. Whether the add-drop multiplexer 10 drops or merely delays the data depends on the capabilities of the add-drop multiplexer and any retransmission strategies adopted by the network. By monitoring the data traffic on the data trunk 30, the add-drop multiplexer 10 creates traffic profiles for the region it services. The add-drop multiplexer 10 communicates the traffic profiles back to the network management center 20 using individuated network management interfaces 25.

Having received a plurality of traffic profiles from each of the add-drop multiplexers 10 in the network, human analysts, that may or may not be augmented with intelligent automated management systems, establish bandwidth allocations for each region serviced by the network. Bandwidth allocations are communicated to each of the plurality of add-drop multiplexers 10 from the network management center 20 using the network management interfaces 25. This prior art method of network management precludes real-time adaptation of the bandwidth allocation for any particular add-drop multiplexer 10.

Figure 2:
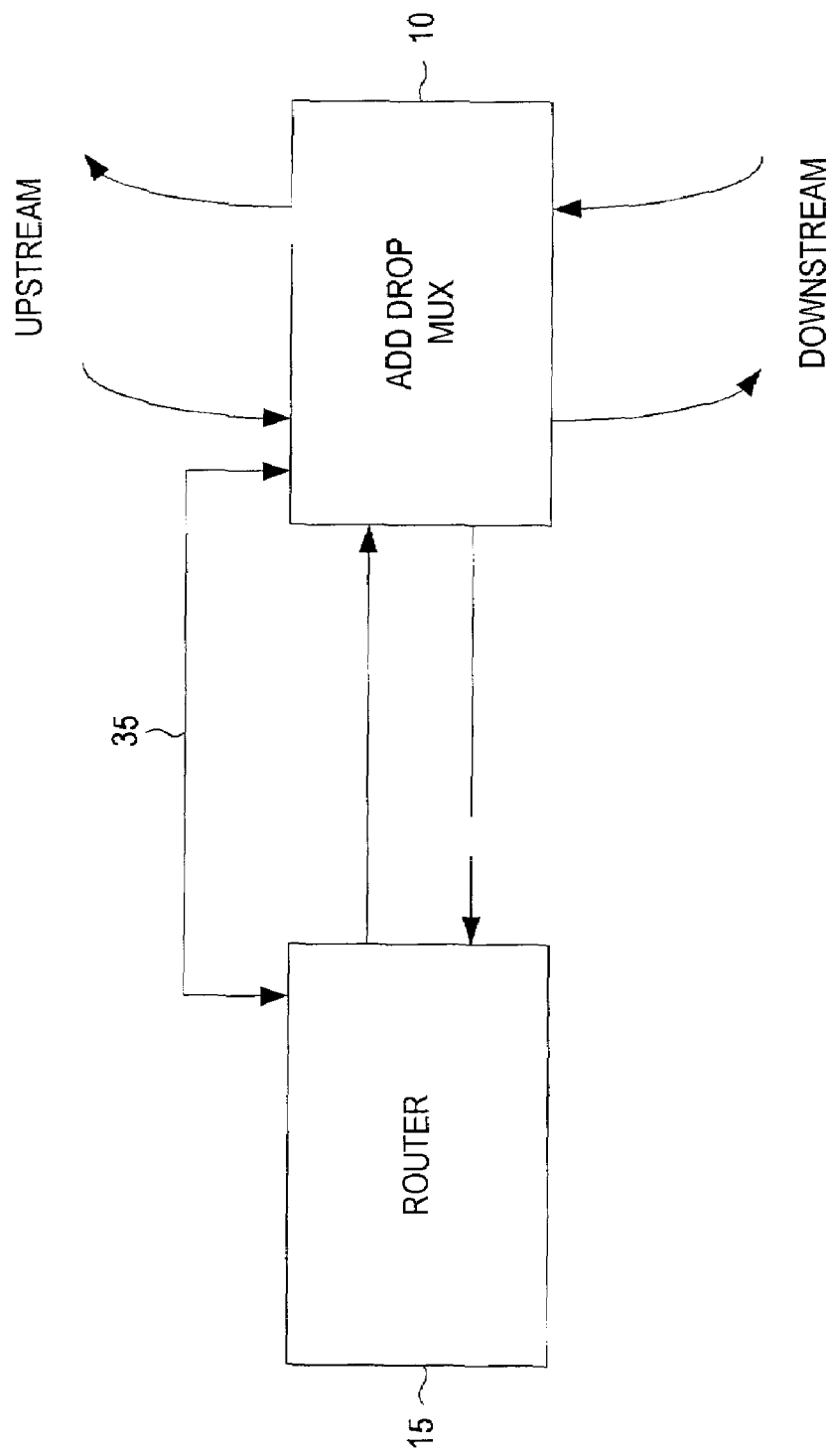
FIG. 2 is a block diagram depicting one example of a new bandwidth management interface between a router and an add-drop multiplexer.
Figure 3:
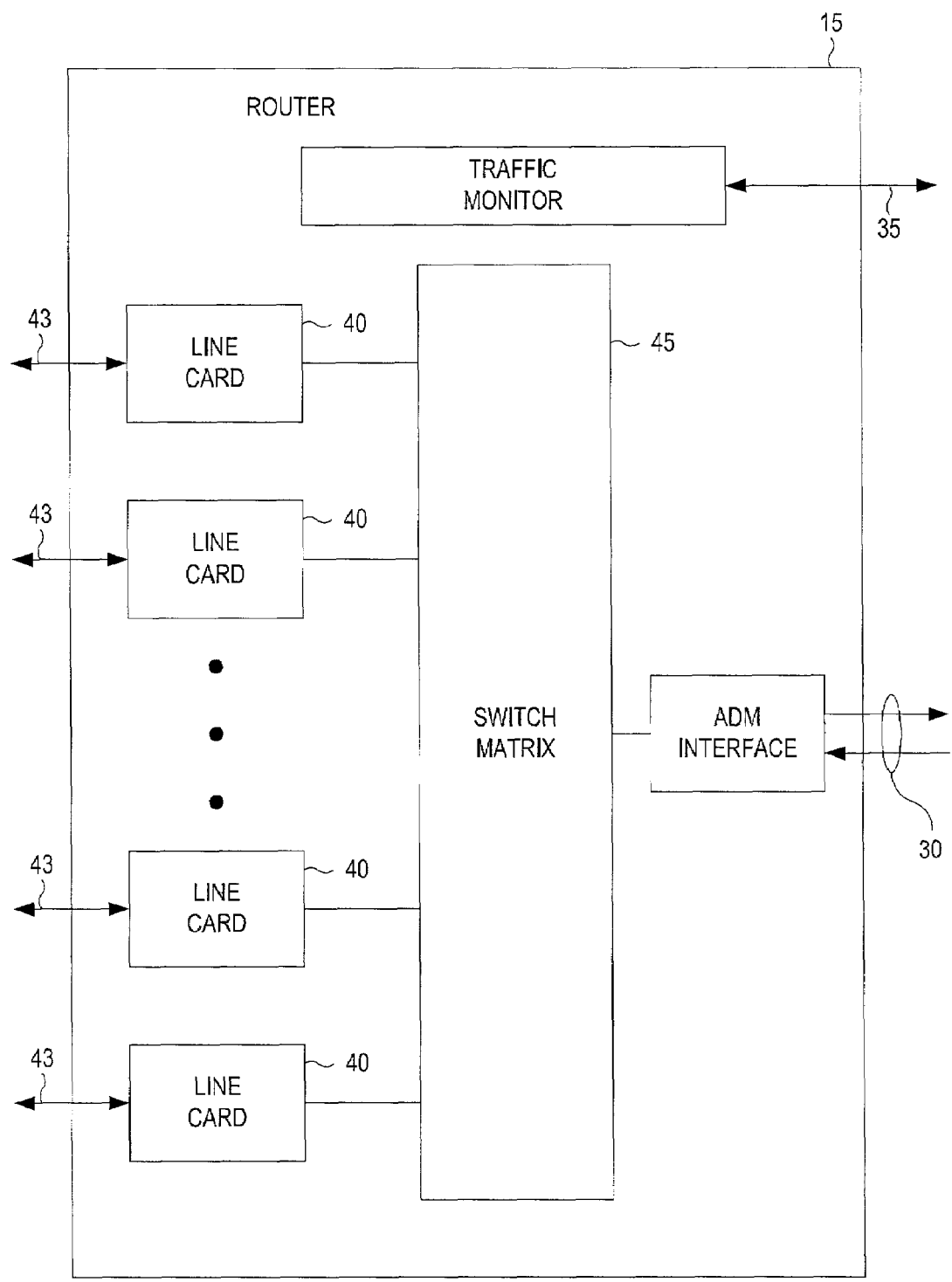
FIG. 3 is a block diagram of one example embodiment of a new router according to the present invention.

FIG. 2 is a block diagram depicting one example of a new bandwidth management interface between a router and an add-drop multiplexer. In this example embodiment of the present invention, the router 15 communicates directly with a new add-drop multiplexer 10 to dynamically modify the bandwidth allocation for data sent from a new router 15 to the add-drop multiplexer 10. The present invention comprises a new router 15 comprising a bandwidth management interface 35. The present invention may further comprise the new add-drop multiplexer 10 that also comprises a bandwidth management interface 35. It is important to note that the add-drop management interface may be a separate physical interface or it may be a function interface that uses the existing interface between the add-drop multiplexer and the router FIG. 3 is a block diagram of one example embodiment of a new router according to the present invention. The new router 15 comprises a line card 40 coupled to a switch matrix 45. The switch matrix 45 is coupled to the add-drop multiplexer interface 50. Each line card 40 comprises a router port 43. Router ports 43 are typically used to interface to network users in a region or to other routers that may be cascaded with a primary router.

One novel element of the new router 15 is a traffic monitor 47. The traffic monitor 47 collects real-time information about the amount of outbound data arriving at the router 15 by way of the router ports 43. The traffic monitor 47 uses this information to determine the aggregate amount of bandwidth required to support the outbound data traffic from a region. The traffic monitor 47 receives a bandwidth allocation from the add-drop multiplexer 10 by way of the bandwidth management interface 35.

In one example embodiment, the traffic monitor 47 compares the instantaneous outbound data traffic volume to the bandwidth allocation received from the add-drop multiplexer 10. In the event that the current outbound traffic volume is less than the bandwidth allocation, the traffic monitor 47 sends a bandwidth release message to the add-drop multiplexer 10. This bandwidth release message instructs the add-drop multiplexer 10 to relinquish control of data packets that it would ordinarily use to convey outbound data to the network.

In the event that the outbound traffic volume is greater than the bandwidth allocation, the traffic monitor 47 sends a bandwidth request message to the add-drop multiplexer 10. In response to the bandwidth request message, the add-drop multiplexer 10 attempts to allocate additional bandwidth from the network.

Figure 4:
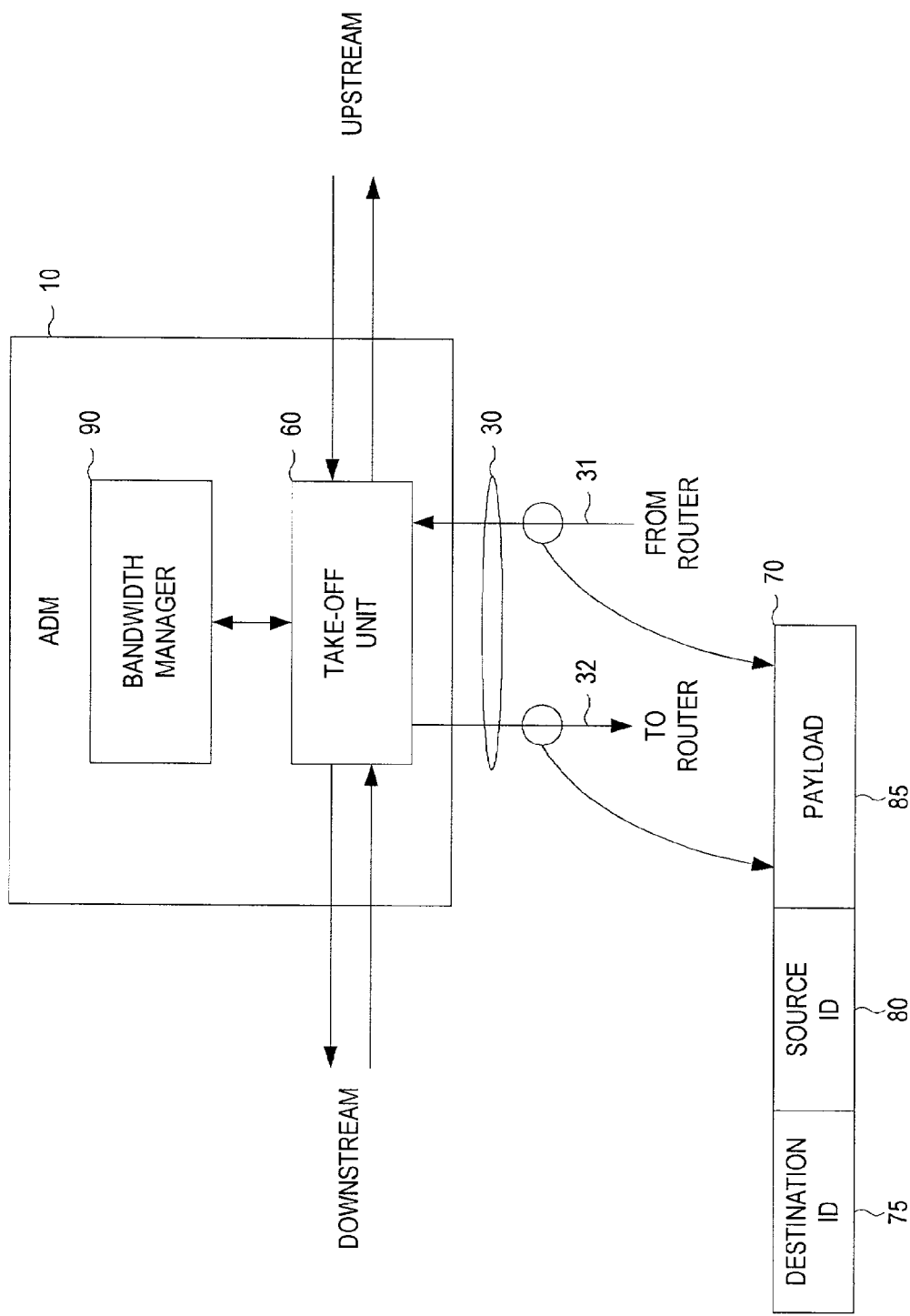
FIG. 4 is a block diagram of a new add-drop multiplexer according to one illustrative embodiment of the present invention.

FIG. 4 is a block diagram of a new add-drop multiplexer according to one illustrative embodiment of the present invention. The add-drop multiplexer comprises a takeoff unit 60 and a bandwidth manager 90. The bandwidth manager 90 comprises a network management interface 25 that connects to the network management center 20. The bandwidth manager 90 also comprises a bandwidth management interface 35. The bandwidth management interface 35 allows the add-drop multiplexer's bandwidth manager 90 to communicate with the traffic manager 47 within the new primary router 15.

In one exemplary embodiment, the bandwidth manager 90 receives bandwidth allocations from the network management center 20 by means of the network management center interface 25. These bandwidth allocations comprise initial values for the amount of bandwidth each add-drop multiplexer must support at the network trunk 30. The network trunk 30 comprises an outbound interface 31 from the primary router and an inbound interface 32 to the primary router.

In this example embodiment, the bandwidth manager 90 coordinates the activity of the takeoff unit 60. The takeoff unit 60 comprises upstream and downstream interfaces to the network. The takeoff unit 60 further comprises the network trunk 30 used to interface to the primary router servicing a region. The takeoff unit 60 receives data packets from the upstream interface and delivers the data packets to the downstream interface. Each data packet 70 comprises an add-drop multiplexer identification field 74, destination field 75, a source field 80, and a payload 85. For the purposes of this discussion, the payload 85 is used to transport data around the network. In a typical embodiment, data is taken off the network by the takeoff unit 60 whenever the destination field 75 falls within the address map for a particular region serviced by the add-drop multiplexer 10. Data egressing from the region by way of the outbound interface 31 is injected into the payload section 85 of a data packet 70.

Because the total amount of bandwidth that the network can carry is limited, each add-drop multiplexer 10 is allocated some finite number of data packets 70 that can be used to transport data. Ownership of these data packets is tracked by the add-drop multiplexer identification field 74 in each data packet 70. The bandwidth manager 90 receives two types of messages from the primary router servicing a particular region. These messages arrive over the bandwidth management interface 35.

The first type of message processed by the bandwidth manager 90 is a bandwidth release message. The bandwidth release message indicates the amount of pre-allocated bandwidth that the region serviced by the add-drop multiplexer 10 will not require at that time. In response to the bandwidth release message, the bandwidth manager 90 directs the takeoff unit 60 to mark data packets owned by that add-drop multiplexer as being "unneeded". In one example embodiment, all that must be done is to set the destination field 75 of the data packet 70 to a null value. Once the data packet is so marked, it is fed into the network. Other add-drop multiplexers in the network can use data packets belonging to other add-drop multiplexers so long as those data packets are marked as unneeded.

The second type of message that the bandwidth manager 90 can receive is the bandwidth request message. The bandwidth request message is a request from the traffic manager 47 in the primary router 15 for additional network bandwidth above and beyond the initial allocation that the bandwidth manager 90 receives from the network management center 20. The bandwidth manager 90 seizes data packets owned by other add-drop multiplexers in an effort to accommodate the additionally requested bandwidth. Depending on system latencies and the buffering capability of the takeoff unit 60, some number of data packets will be captured to support the additionally requested bandwidth. Once these data packets are captured, the bandwidth manager 90 notifies the traffic manager 47 how much additional bandwidth has been secured.

In a different embodiment, the bandwidth manager 90 monitors the availability of bandwidth on a continuous basis. Based on this statistical analysis of the number of unneeded data packets traversing the network, the bandwidth manager 90 advises the traffic manager 47 how much additional bandwidth could be made available. In this alternative embodiment, the traffic manager 47 allows outbound data to be directed to the takeoff unit 60. The takeoff unit 60 buffers the outbound data and then transports the data over the network as unneeded data packets owned by other add-drop multiplexers arrive in the takeoff unit 60.

In either of these embodiments, the data manager 90 may determine that additional bandwidth is not available. In this case, the bandwidth manager 90 so notifies the traffic manager 47. The traffic manager 47 can be programmed to respond in three different ways if additional bandwidth is not available. In the first mode, the traffic manager simply discards the outbound data that cannot be accommodated by the allocated bandwidth. Higher levels of communication protocols employed by processes using the network may resend data that is so discarded. The traffic manager 47 can also be instructed to shape the traffic pattern for the outbound data. In this mode, the traffic manager 47 buffers the outbound data until additional bandwidth can be allocated or until the outbound data can be accommodated by the initial allocation. The traffic manager 47 also supports a throttling mode. In this mode, the traffic manager 47 throttles back the sources of the outbound data thereby causing the sources to delay the transmission of the data. The data sources may retransmit data at a later time when additional bandwidth can be allocated or the aggregate outbound data volume can be accommodated by the initial allocation.

Figure 5:
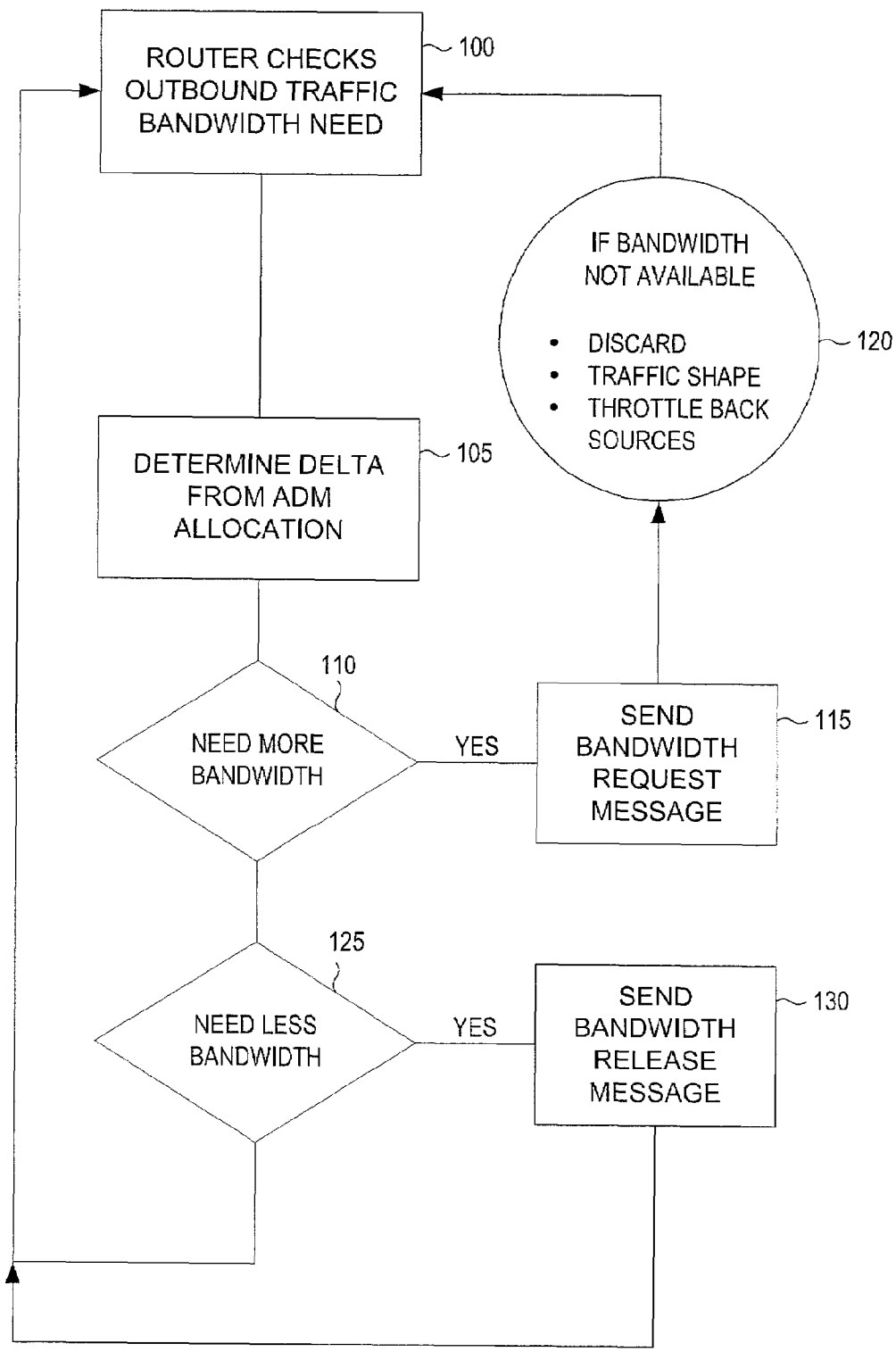
FIG. 5 is a flow diagram that summarizes the process of dynamic bandwidth allocation according to one embodiment of the present invention.

FIG. 5 is a flow diagram that summarizes the process of dynamic bandwidth allocation according to one embodiment of the present invention. The first step in the process occurs in the traffic manager 47 located in a primary router 15. This first step is that of checking the amount of bandwidth that is actually needed to support the outbound traffic from the region (step 100). Following this, the process requires that the amount of actual bandwidth required be compared with the bandwidth allocation received from the network management center 20 (step 105).

When the amount of outbound traffic from a region exceeds the bandwidth allocated by the network management center 20, as determined by a simple comparison (step 110), the traffic manager 47 sends a bandwidth request message (step 115) to the bandwidth manager 90 located in the add-drop multiplexer servicing the region. The bandwidth manager 90 will receive the bandwidth request message. In response, the bandwidth manager 90 determines if the network can accommodate additional bandwidth. The bandwidth manager 90 notifies the traffic manager 47 regarding the availability of additional bandwidth. If additional bandwidth is available the traffic manager 47 directs the outbound data outward to the network. If additional bandwidth is not available, the traffic manager 47 either discards the data, attempts to shape the traffic pattern of the outbound data, or throttles back the sources of the outbound data until additional bandwidth can be made available (step 120).

If the aggregate amount of outbound data from the region is less than the allocated bandwidth (step 125), the traffic manager 47 sends a bandwidth release message (step 130) to the bandwidth manager 90. The bandwidth manager 90 causes the takeoff unit 60 to mark as unneeded data packets that it owns so that other regions can use those data packets to transport data as needed.

ALTERNATIVE EMBODIMENTS

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents.

In some embodiments, existing signaling protocols may be used to control the dynamic bandwidth allocations. Use of these existing signaling protocols may include, but may not necessarily be limited to CCS#7 (a.k.a. SS7). Although non-standard, proprietary signaling has been described herein, use of these standardized signaling protocols would allow for wider applicability of the present invention vis-à-vis the world's installed based of known routers and add-drop multiplexers.

We claim:

1. A method for dynamically modulating the bandwidth allocation for a network trunk comprising the steps of:
   receiving a pre-established bandwidth allocation for a region;
   measuring the aggregate outbound data traffic from the region;
   requesting additional bandwidth beyond the allocation if the difference between the pre-established bandwidth allocation for the region and the measured aggregate of outbound data traffic from the region indicates that more bandwidth is required to carry the outbound traffic from the region than is allocated; and
   releasing bandwidth not required if the difference between the pre-established bandwidth allocation for the region and the measured aggregate of outbound data traffic from the region indicates that less bandwidth is required to carry the outbound traffic from the region than is allocated;
   wherein the step of requesting additional bandwidth further comprises the steps of:
      sending to an add-drop multiplexer servicing the region a message that indicates that additional bandwidth is required;
      sending the total amount of outbound data to the add-drop multiplexer if a message indicating that additional bandwidth is available is received from the add-drop multiplexer servicing the region; and
      discarding the outbound data, shaping the traffic profile of the outbound data, or throttling back the data sources feeding the outbound data to the primary router servicing the region if a message indicating that additional bandwidth is not available is received from the add-drop multiplexer servicing the region.

2. The method of claim 1 further comprising the step of utilizing data packets marked as unneeded and allocated to other regions when the difference between the pre-established bandwidth allocation for the region and the measured aggregate of outbound data traffic from the region indicates that more bandwidth is required to carry the outbound traffic from the region than is allocated.

3. The method of claim 1 wherein the step of receiving the pre-established bandwidth allocation for a region comprises the steps of:
   accepting a message from a network management center in an add-drop multiplexer; and
   forwarding the message to a primary regional router servicing the region.

4. The method of claim 1 wherein the step of measuring the aggregate outbound data traffic from the region comprises the steps of:
monitoring the amount of outbound traffic received by each port of a primary regional router; and
summing the amount of outbound traffic received by each port of a primary router to determine an outbound traffic level.

5. The method of claim 1 further comprising the steps of:
receiving the outbound data from the region in the add-drop multiplexer;
receiving data packets in the add-drop multiplexer that are owned by add-drop multiplexers that service other regions and are marked as unneeded; and
injecting the outbound data from the region into the data packets marked as unneeded and owned by other add-drop multiplexers.

6. The method of claim 1 wherein the step of releasing unneeded bandwidth allocation comprises the steps of:
sending to the add-drop multiplexer a message indicating that less bandwidth is required than is currently allocated; and
marking data packets running through the add-drop multiplexer that are owned by the region serviced by the add-drop multiplexer as being unneeded so that other regions can use those data packets.

7. The method of claim 1, wherein the bandwidth is released by marking data packets allocated to the region as unneeded so that the data packets can be used by other regions.

8. A system for dynamically allocating the bandwidth allocation for a network trunk comprising:
a bandwidth manager that receives a bandwidth allocation for a region;
a traffic manager that measures the amount of data traffic being sent outbound from a region and requests additional bandwidth when the amount of outbound data exceeds the received bandwidth allocation and releases bandwidth allocated to the region when the outbound traffic from the region is less than the allocation, wherein the traffic manager sends bandwidth requests or release messages to the bandwidth manager, and the bandwidth manager determines if there is additional bandwidth available in the network and signals the traffic manager when additional bandwidth is available; and
wherein the traffic manager sends outbound data to the network in response to a bandwidth available message received from the bandwidth manager and either discards the outbound data, reshapes the traffic profile of the outbound data or throttles back the sources of the outbound data in response to a bandwidth not available message received from the bandwidth manager.

9. The system of claim 8, further comprising a take-off unit that utilizes data packets owned by other regions and that are marked as unneeded when the aggregate outbound data from the region exceeds the bandwidth allocation received by the bandwidth manager.

10. The system of claim 8, further comprising a take-off unit that marks as unneeded data packets owned by the region that are not fully utilized by the amount of outbound data being sent by the region.

11. A system for dynamically allocating the bandwidth allocation for a network trunk comprising:
a bandwidth manager that receives a bandwidth allocation for a region;
a traffic monitor that measures the amount of data traffic being sent outbound from a region and requests additional bandwidth when the amount of outbound data exceeds the received bandwidth allocation and releases bandwidth allocated to the region when the outbound traffic from the region is less than the allocation; and
wherein the traffic manager is located in a primary router for the region and the bandwidth manager is located in an add-drop multiplexer that services the region and wherein the request for additional bandwidth is made by means of a bandwidth request message sent from the primary router to the add-drop multiplexer and wherein the release of bandwidth is made by means of a bandwidth release message sent from the primary router to the add-drop multiplexer.

12. The system of claim 11 wherein the add-drop multiplexer sends a bandwidth available message to the primary router if there is additional bandwidth available on the network and further comprises a take-off unit that receives outbound data from the primary router and injects the outbound data into data packets flowing through the take-off unit that are marked as unneeded and that are owned by a different add-drop multiplexer that services a different region when outbound data is received in response to the bandwidth available message sent to the primary router.

13. The system of claim 11 wherein the add-drop multiplexer receives a bandwidth release message from the primary router and further comprises a take-off unit that marks data packets owned by the add-drop multiplexer servicing the region as unneeded and then directs the data packets to the network.

14. A network router comprising:
a traffic monitor that measures the amount of data traffic being sent outbound from a region and requests additional bandwidth when the amount of outbound data exceeds a received bandwidth allocation and releases bandwidth allocated to the region when the outbound traffic from the region is less than the received bandwidth allocation;
wherein the traffic manager sends bandwidth request or release messages to a bandwidth manager and wherein the bandwidth manager determines if there is additional bandwidth available in the network and signals the traffic manager when additional bandwidth is available; and
wherein the traffic manager sends outbound data to the network in response to a bandwidth available message received from the bandwidth manager and either discards the outbound data, reshapes the traffic profile of the outbound data or throttles back the sources of the outbound data in response to a bandwidth not available message received from the bandwidth manager.

* * * * *